(12) United States Patent
Klatt

(10) Patent No.: US 11,129,356 B2
(45) Date of Patent: Sep. 28, 2021

(54) NESTABLE CAT LITTER BOX

(71) Applicant: David Klatt, New Castle, WA (US)

(72) Inventor: David Klatt, New Castle, WA (US)

( * ) Notice: Subject to any disclaimer, the term of this patent is extended or adjusted under 35 U.S.C. 154(b) by 317 days.

(21) Appl. No.: 16/534,698

(22) Filed: Aug. 7, 2019

(65) Prior Publication Data

US 2021/0037781 A1 Feb. 11, 2021

(51) Int. Cl.
*A01K 1/01* (2006.01)

(52) U.S. Cl.
CPC .................................. *A01K 1/0114* (2013.01)

(58) Field of Classification Search
CPC ..... A01K 1/0114; A01K 1/0107; A01K 1/011
USPC ................. 119/165, 166, 167, 168, 161, 170
See application file for complete search history.

(56) References Cited

U.S. PATENT DOCUMENTS

| | | | | |
|---|---|---|---|---|
| 2,963,003 A * | 12/1960 | Oberg | ................... | A01K 1/0114 119/166 |
| 4,217,857 A * | 8/1980 | Geddie | ................. | A01K 1/0114 119/166 |
| 4,325,325 A * | 4/1982 | Larter | ................... | A01K 1/0114 119/166 |
| 4,771,731 A * | 9/1988 | Derx | ..................... | A01K 1/0107 119/166 |
| 5,168,834 A * | 12/1992 | Buschur | ................ | A01K 1/0114 119/166 |
| 5,598,811 A * | 2/1997 | Merchant | ............. | A01K 1/0114 119/166 |
| 5,701,845 A * | 12/1997 | Jablonski | ............. | A01K 1/0114 119/165 |
| 5,797,346 A * | 8/1998 | Lewis | ................... | A01K 1/0114 119/166 |
| 5,799,610 A * | 9/1998 | Poulos | ................. | A01K 1/0114 119/166 |
| 5,893,336 A * | 4/1999 | Vice | ...................... | A01K 1/0114 119/166 |
| 6,401,660 B1 * | 6/2002 | Wolff | .................... | A01K 1/0114 119/165 |
| 6,994,054 B2 | 2/2006 | Matsuo et al. | | |
| 7,131,396 B2 | 11/2006 | Matsuo et al. | | |
| 8,074,603 B2 * | 12/2011 | Ohlman | ............... | A01K 1/0114 119/167 |
| 8,656,863 B2 | 2/2014 | Havluciyan | | |
| 9,204,617 B2 * | 12/2015 | Yamamoto | ........... | A01K 1/0114 |
| 10,076,098 B2 * | 9/2018 | Matsuo | ................ | A01K 1/0114 |
| 10,159,215 B2 * | 12/2018 | Petty | .................... | A01K 1/0114 |
| 10,342,211 B2 | 7/2019 | Mikacich | | |

(Continued)

*Primary Examiner* — Yvonne R Abbott-Lewis
(74) *Attorney, Agent, or Firm* — Thomas E. Loop

(57) ABSTRACT

An innovative nestable cat litter box is disclosed herein for use with pellet-type cat litter such as, for example, pine pellets. The nestable cat litter box comprises a bottom collection box, a middle support shell removably attachable to the bottom collection box, and an upper sift box removably attachable to the middle support shell. The upper sift box may be characterized as further including a bottom screen that has a plurality of discrete screen regions separated from one another and further sub-divided within each discrete screen by a plurality of first, second, and third intersecting cross members. In certain preferred embodiments, the depths of the first cross members are greater than the depths of the second cross members, and the depths of the second cross members are greater than depths of the third cross members.

6 Claims, 7 Drawing Sheets

(56) References Cited

U.S. PATENT DOCUMENTS

| | | | |
|---|---|---|---|
| 2006/0065203 A1* | 3/2006 | Schmidt | A01K 1/0114 119/161 |
| 2008/0314328 A1* | 12/2008 | Johnson | A01K 1/0114 119/166 |
| 2009/0194033 A1* | 8/2009 | Modlin | A01K 1/0114 119/167 |
| 2012/0325159 A1* | 12/2012 | Penner | A01K 1/0114 119/166 |
| 2015/0327508 A1* | 11/2015 | Maddox | A01K 1/0114 119/166 |
| 2018/0192610 A1 | 7/2018 | Petty et al. | |
| 2019/0045738 A1 | 2/2019 | Remick | |
| 2019/0216042 A1 | 7/2019 | Sareyani | |

* cited by examiner

NESTABLE CAT LITTER BOX

TECHNICAL FIELD

The present invention relates generally to cat litter boxes and, more specifically, to cat litter boxes for use with pellet-type cat litter.

BACKGROUND OF THE INVENTION

With respect to our domesticated feline friends, pine litter is a preferred litter for less tracking throughout the house. Pine pellet cat litter comes in the form of pellets and is very cheap for use a cat litter because it is made for other purposes that brings its cost down (e.g., horse bedding). A problem occurs when cat urine breaks down the pellets, creating a fine sawdust. This defeats the benefits as a low-tracking litter, requiring frequent cleaning. There are current cat litter box designs that have a box with sifting holes and a tray below to collect the resulting sawdust, but the trays are shallow and still require frequent cleaning (see, e.g., "Feline Pine Litter Box"). Many cat owners have also come up with DIY boxes to sift out the sawdust into a collection box below. Problems with DIY boxes include creating an efficient screen pattern and sealing odors from the waste in the collection box.

The present invention fulfills these needs and provides for further related advantages.

SUMMARY OF THE INVENTION

In brief, the present invention is directed to a nestable cat litter box (preferably, but not necessarily, for use with pellet-type cat litter such as, for example, pine pellets or any other similar type of plant-based pellet cat litter that breaks down to fine particles when exposed to cat urine), comprising: a bottom collection box; a middle support shell removably attachable to the bottom collection box; and an upper sift box removably attachable to the middle support shell. The upper sift box may be characterized as further including a bottom screen that has a plurality of discrete screen regions separated from one another by a plurality of first intersecting cross members that span across the bottom screen, wherein each discrete screen region includes a plurality of spaced apart second intersecting cross members that span across each respective discrete screen region, with the second intersecting cross members defining inner slit regions, and wherein a plurality of spaced apart third parallel cross members span across the spaced apart second cross members so as to define a plurality of spaced apart parallel slits within each inner slit region. The plurality of parallel slits within each inner slit region define alternating groups of parallel slits, wherein each group of parallel slits is substantially perpendicular to each adjacent group of parallel slits within each discrete screen area.

In certain preferred embodiments, the depths of the first cross members are greater than the depths of the second cross members, and the depths of the second cross members are greater than depths of the third cross members.

The innovative litter box disclosed herein consists essentially of three parts (i.e., a bottom collection box, a middle support shell, and an upper sift box) that, when used and nested together, maintain a clean, nearly dust-free environment in and around the litter box. This configuration also seals the waste litter below the upper sift box and inside the middle support shell, preventing unwanted odors from escaping into one's home. The bottom collection box is preferably sized and configured to fit most standard litter box liners, helping to make removal of the waste litter a relatively easy and clean process. In addition, the depth of the bottom collection box is preferably great enough to allow waste litter to collect over several days before cleaning is required.

At the bottom of the upper sifting box, an alternating square pattern of five equally spaced apart slits are defined, with each slit having a width that is slightly more than half the diameter of a pellet of a pellet-style litter (typically about ⅛ inch diameter). Each alternating square pattern of slits is small enough in size that directional scratching from a cat will be nearly parallel to some of the slits for each stroke of its paw. This allows for the efficient clearing of sawdust material from the upper sift box to the bottom collection box. Due to the plastic molded construction of the litter box, the alternating square patterns of slits preferably include additional support material extending vertically below, preferably with increased depth for each larger pattern (i.e., if material separating slits are at a depth of x, the square pattern around every 5 slits is at a depth of 2x, and a larger pattern surrounding groups of squares and the perimeter of entire pattern is at a depth of 3x). In this configuration and with only daily solid waste removal being necessary, minor scraping of the litter with a scoop or a cat scratching will keep the upper sift box clean for several days or weeks, depending on frequency of use.

These and other aspects of the present invention will become more readily apparent when reference is made to the following detailed description in conjunction with the accompanying drawings.

BRIEF DESCRIPTION OF THE DRAWINGS

The drawings are intended to be illustrative of certain preferred embodiments of the present invention. Like reference numerals have been used to designate like features throughout the several views of the drawings.

DETAILED DESCRIPTION OF THE INVENTION

Figure 1:
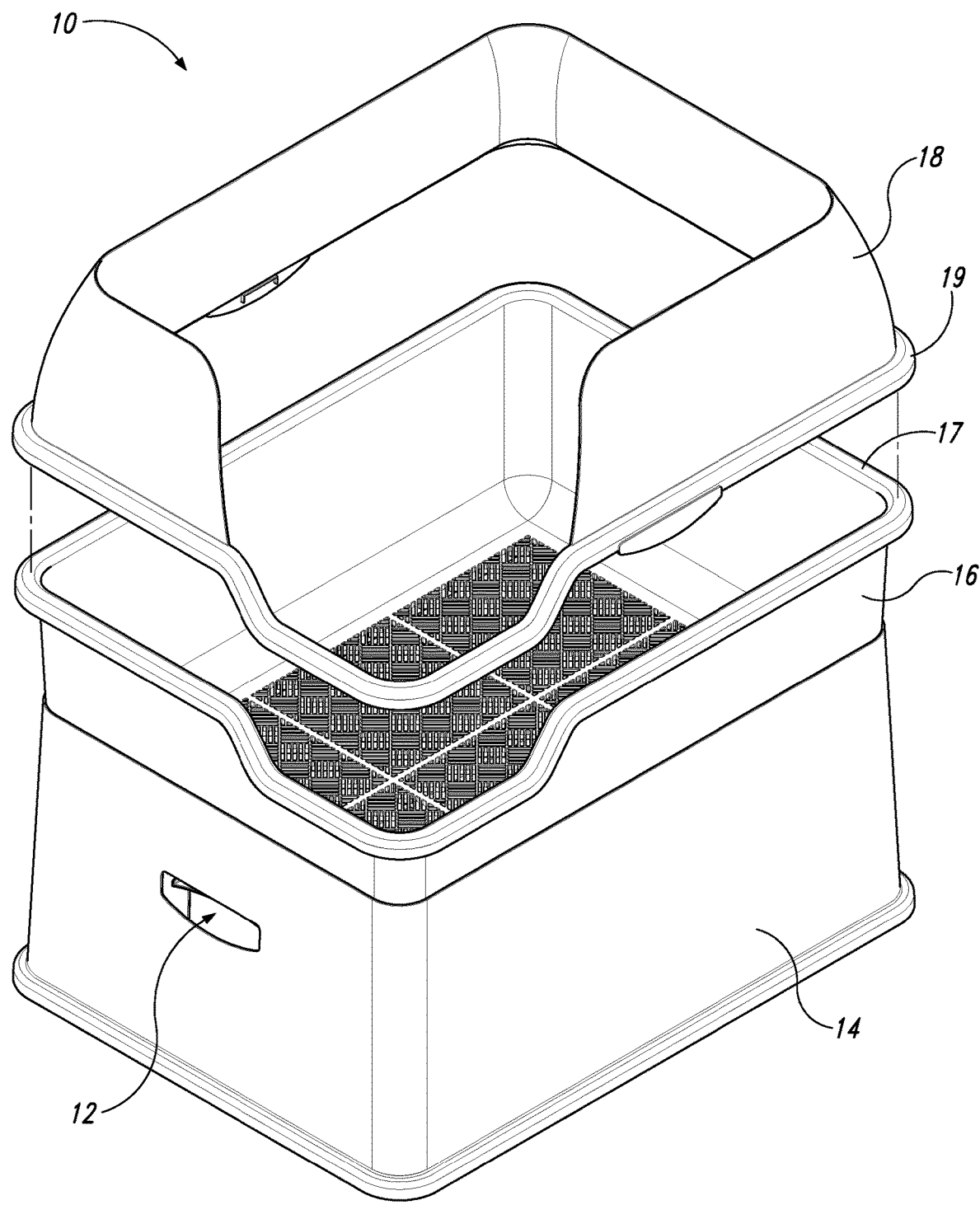
FIG. 1 is a perspective assembled view of a nestable cat litter box (shown having a bottom collection box that is largely obscured and a scatter shield that is elevated) in accordance with an embodiment of the present invention.

In the following detailed description, reference is made to the accompanying drawings, which form a part hereof. In the drawings, similar symbols or markings typically identify like or corresponding elements, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Figure 2:
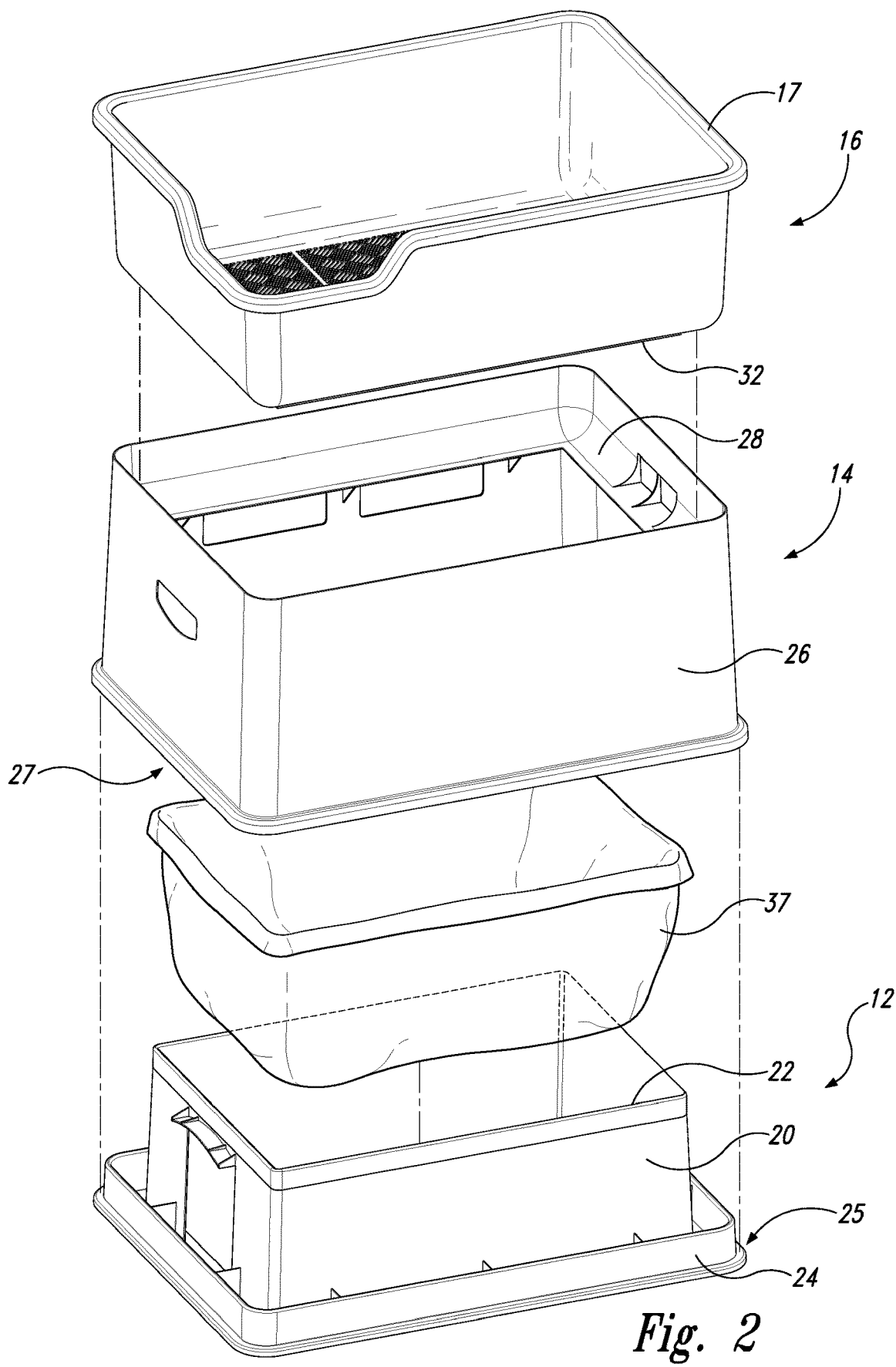
FIG. 2 is an elevated perspective exploded view of the nestable cat litter box shown in FIG. 1 (but shown without its removable scatter shield).
Figure 3:
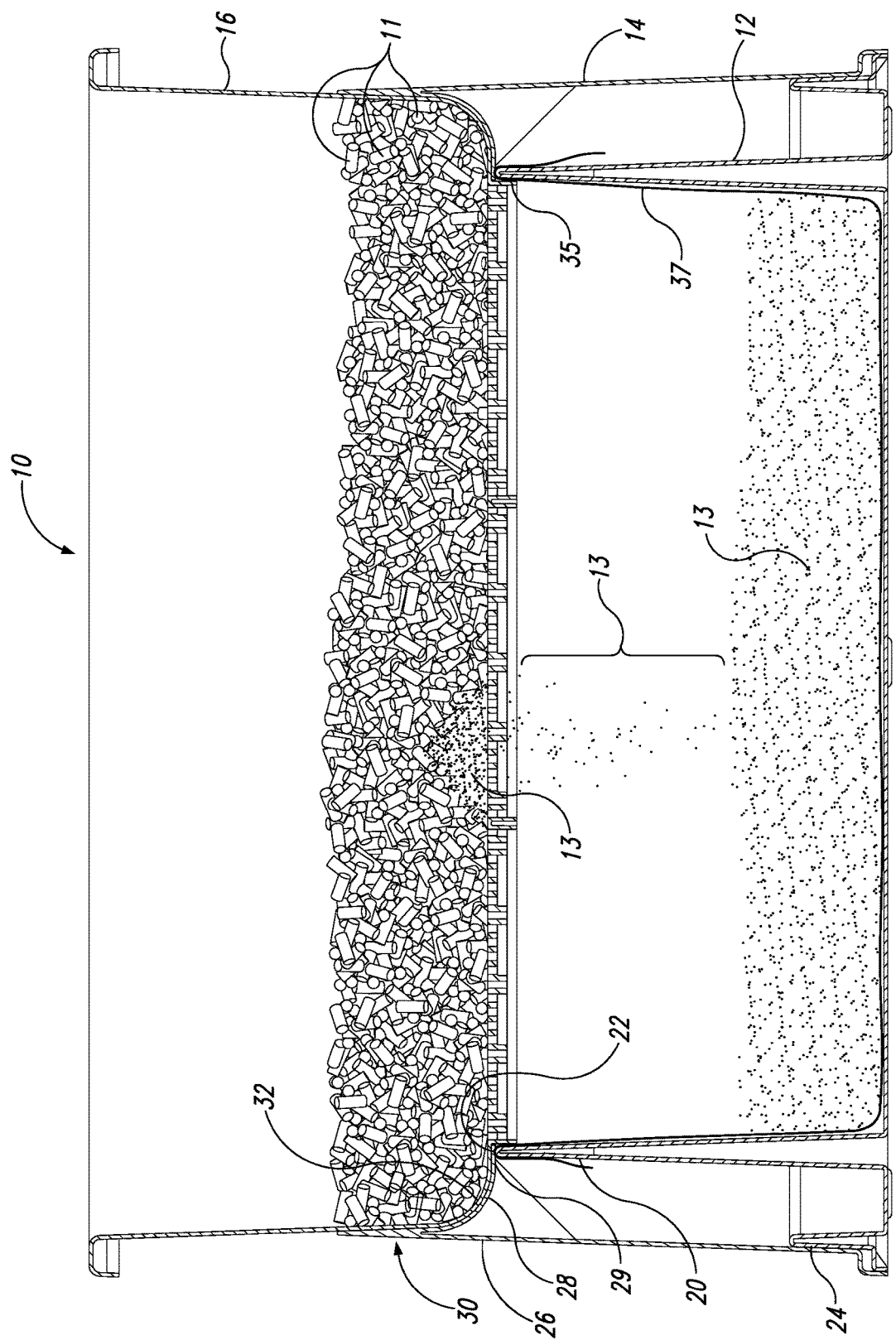
FIG. 3 is a side cross-sectional view of the nestable cat litter box shown in FIG. 1 (shown without its removable scatter shield and including pellets and sawdust).
Figure 6:
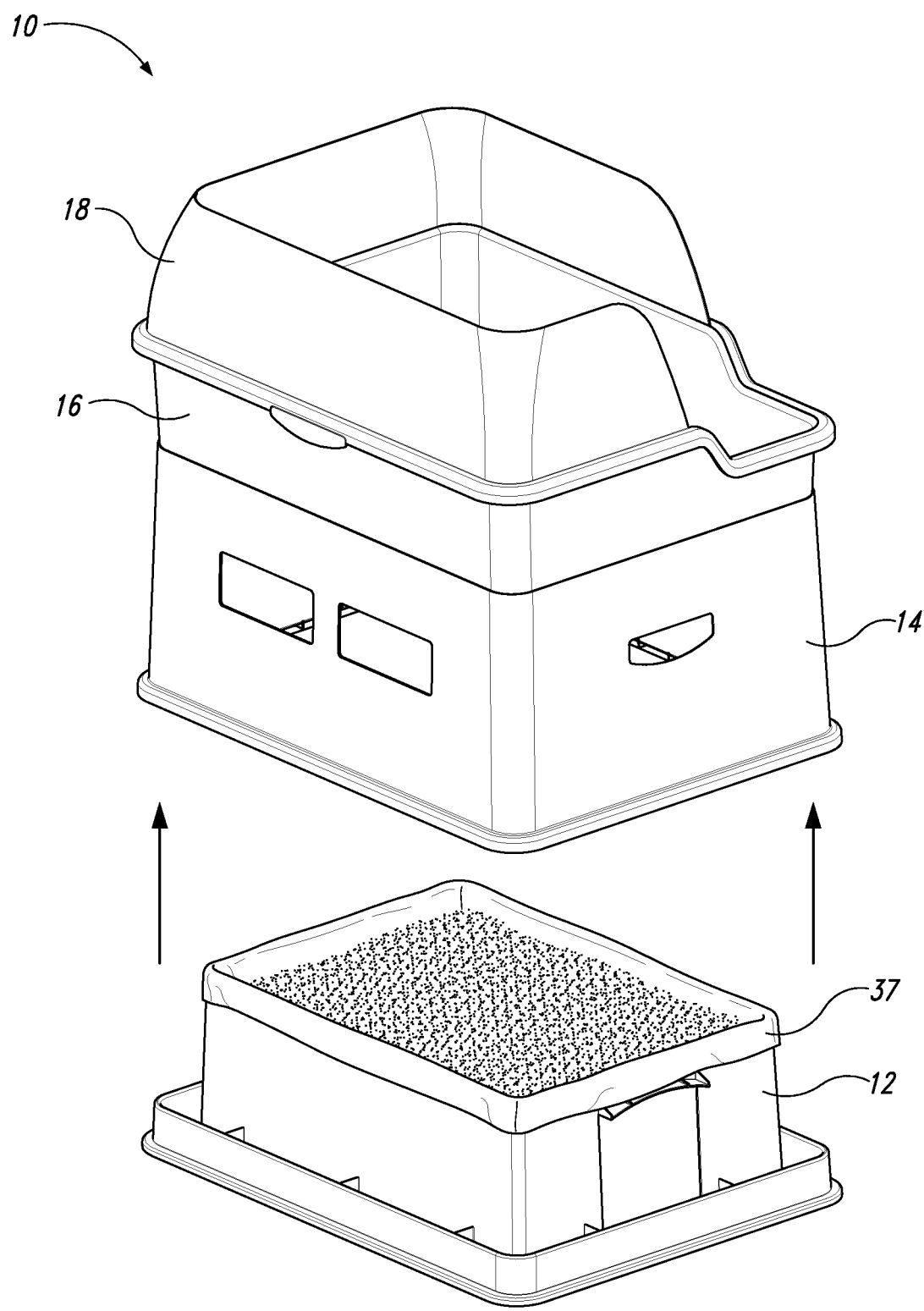
FIG. 6 is a perspective partially-assembled view of the nestable cat litter box shown in FIG. 1 (but shown with its removable scatter shield, upper sift box, and middle support shell being elevated above the bottom collection box).

Thus, and in view of the foregoing and referring now to the drawings, and more particularly to FIGS. 1, 2 and 6, the present invention is directed to a nestable cat litter box 10 that is configured for use with pellet-type cat litter (shown only in FIG. 3 as pellets 11). As best shown in FIGS. 1, 2 and 6, the nestable cat litter box 10 comprises a bottom collection box 12, a middle support shell 14 removably attachable to the bottom collection box 12, and an upper sift box 16 (for holding pellet-style cat litter) removably attachable to the middle support shell 16 (as well as, in some embodiments, an optional removably attachable scatter shield 18).

As best shown in FIG. 1, the optional scatter shield 18 includes a lower peripheral scatter shield edge 19, while the upper sift box 16 includes a matching upper peripheral sift box edge 17. When the scatter shield 18 is positioned about and placed on the upper sift box 16 (as shown in FIG. 6), the lower peripheral scatter shield edge 19 fits inside and engages the matching upper peripheral outer collection box edge 17.

As best shown in FIG. 2, the bottom collection box 12 includes an inner collection box peripheral wall 20 having a top ledge 22 and an outer collection box peripheral wall 24 concentric about the inner collection box peripheral wall 20. The middle support shell 14 is removably attachable to the bottom collection box 12 (as shown in FIG. 6) and includes an outer shell peripheral wall 26 that, when the middle support shell 14 is positioned about and placed on the bottom collection box 12 (i.e., is nested as shown in FIG. 1), sealingly abuts and frictionally fits together with the outer collection box peripheral wall 24. As best shown in FIGS. 2 and 3, the middle support shell 14 further includes an inwardly and downwardly extending curved ledge 28 connected to an upper portion 30 of the outer shell peripheral wall 26.

As best shown in FIG. 3, the upper sift box 16 is removably attachable to the middle support shell 14 and includes a matching bottom peripheral curved edge 32 that, when the upper sift box 16 is positioned within and placed on the middle support shell 14 (i.e., is nested), sealingly abuts and frictionally fits together with the curved ledge 28 of the middle support shell 14. When the middle support shell is positioned about and placed on the bottom collection box (i.e., is nested as shown in FIG. 3), the top ledge 22 of the inner collection box peripheral wall 20 of the bottom collection box 12 abuts (via an interposing liner 37) both (i) a lower portion 29 of the curved ledge 28 of the middle support shell 14, and (ii) a peripheral edge 35 of the bottom screen 34 of the upper sift box 16. In addition, the outer shell peripheral wall 26 of the middle support shell 24 includes a lower peripheral shell wall edge 27, and wherein the outer collection box peripheral wall 24 of the bottom collection box 12 includes a matching lower peripheral outer collection box wall edge 25. The lower peripheral shell wall edge 27 fits inside and engages the matching lower peripheral outer collection box edge 25 when the middle support shell 14 is positioned about and placed on the bottom collection box 12 (i.e., is nested as shown in FIG. 3).

Figure 4A:
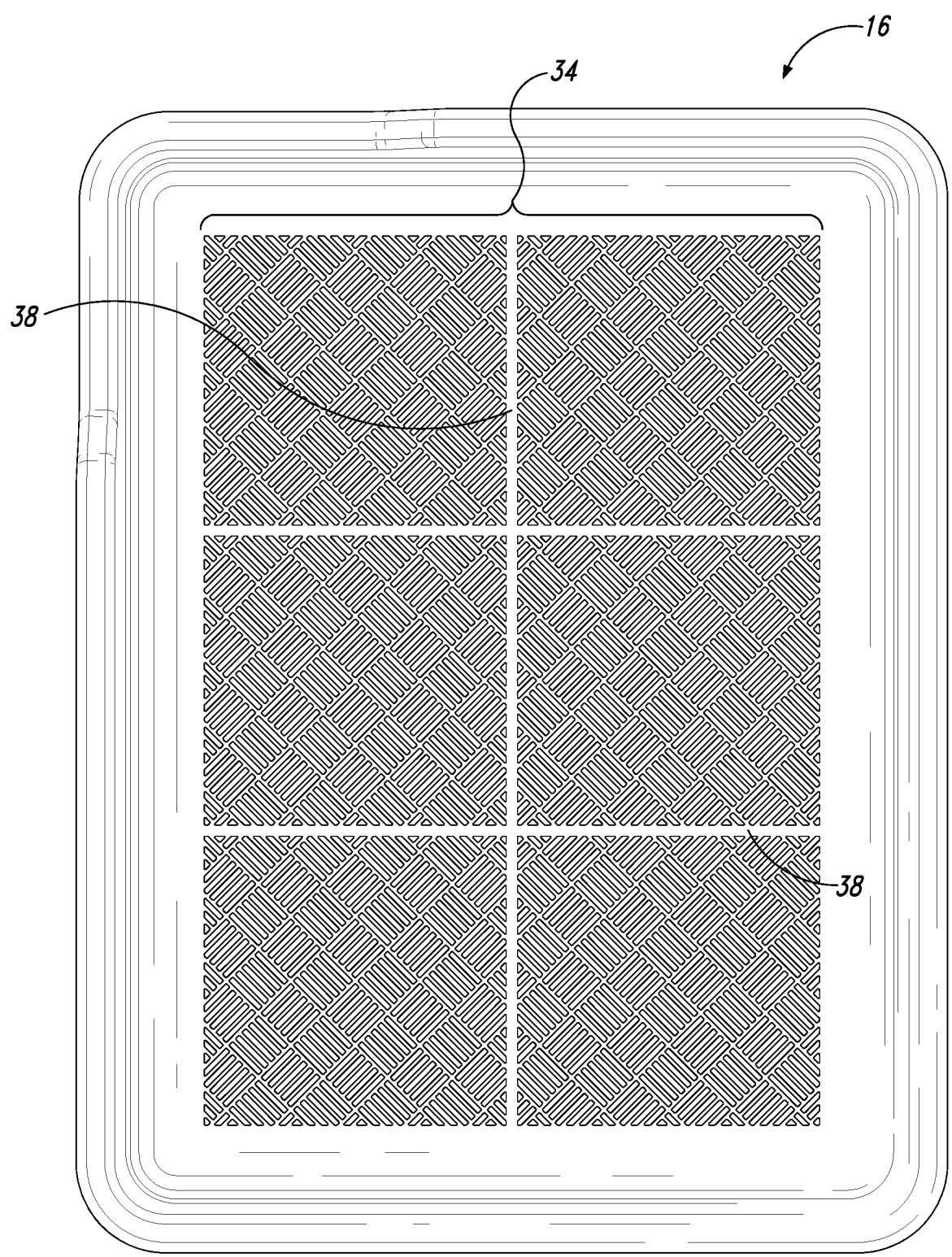
FIG. 4A is a top plan view of the sift box component of the nestable cat litter box shown FIGS. 1-3.
Figure 4B:
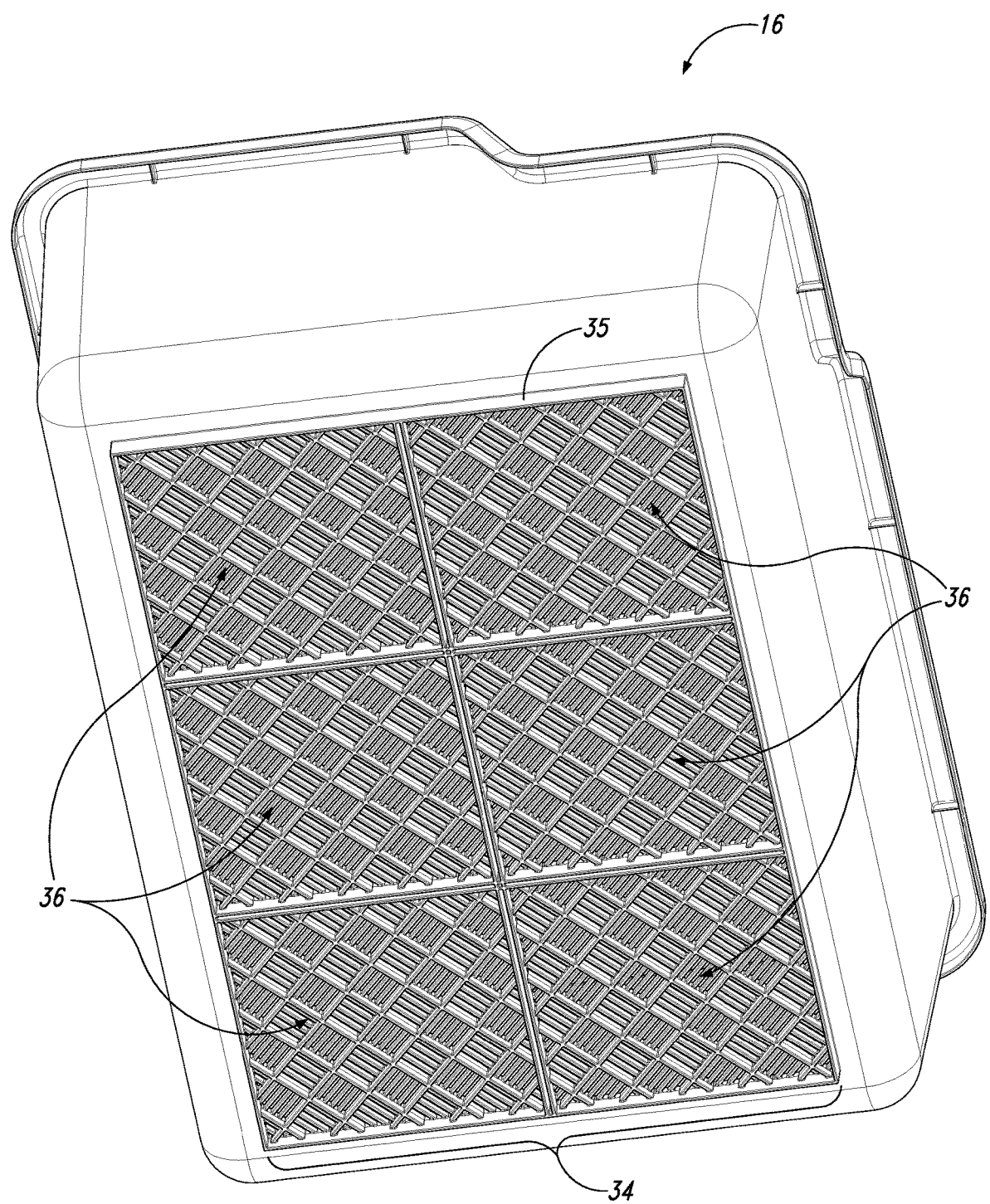
FIG. 4B is a bottom perspective view of the sift box shown in FIG. 4A.
Figure 5A:
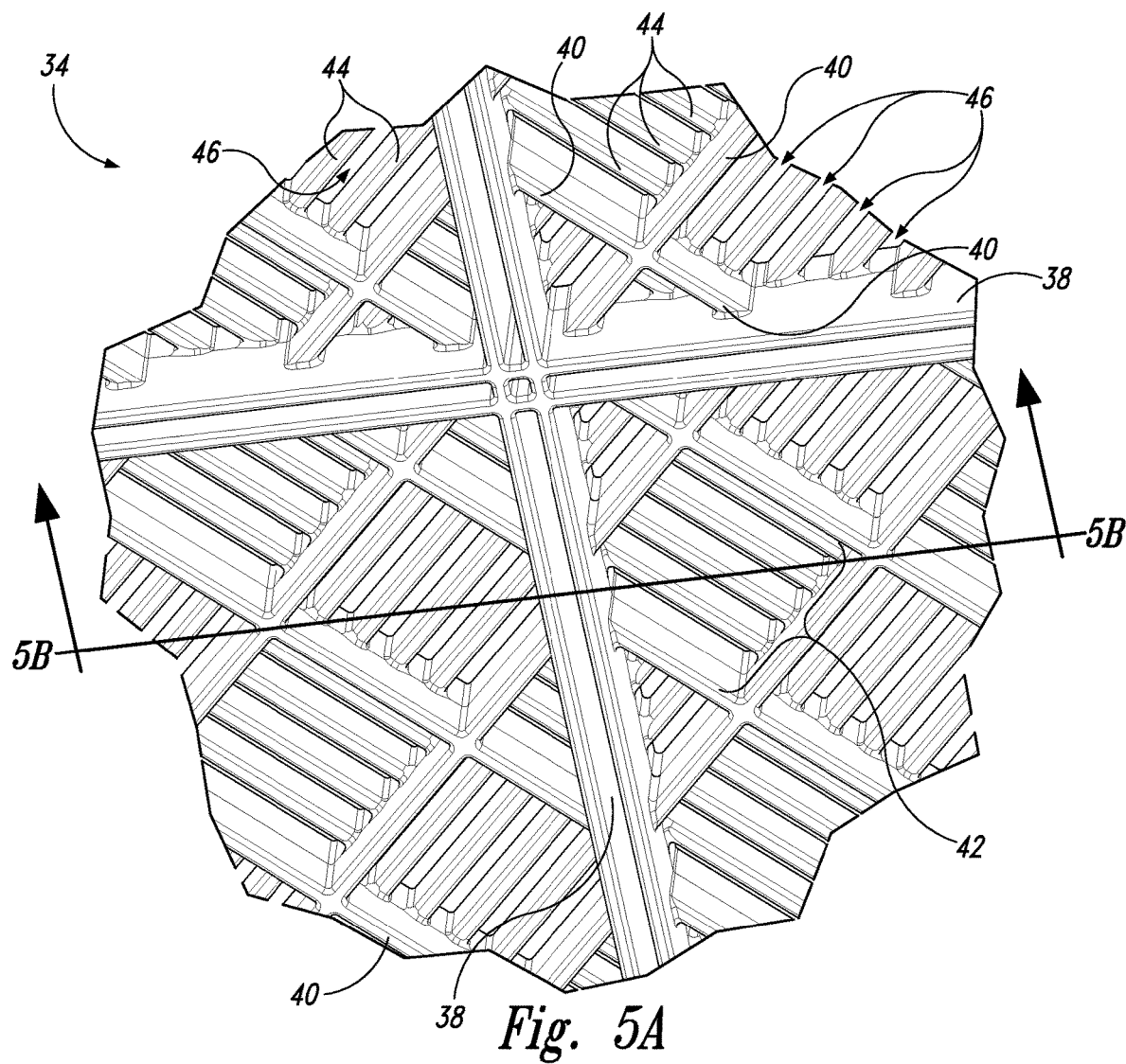
FIG. 5A is an enlarged perspective view of an area of the bottom screen of the sift box component shown in FIGS. 1-4B.
Figure 5B:
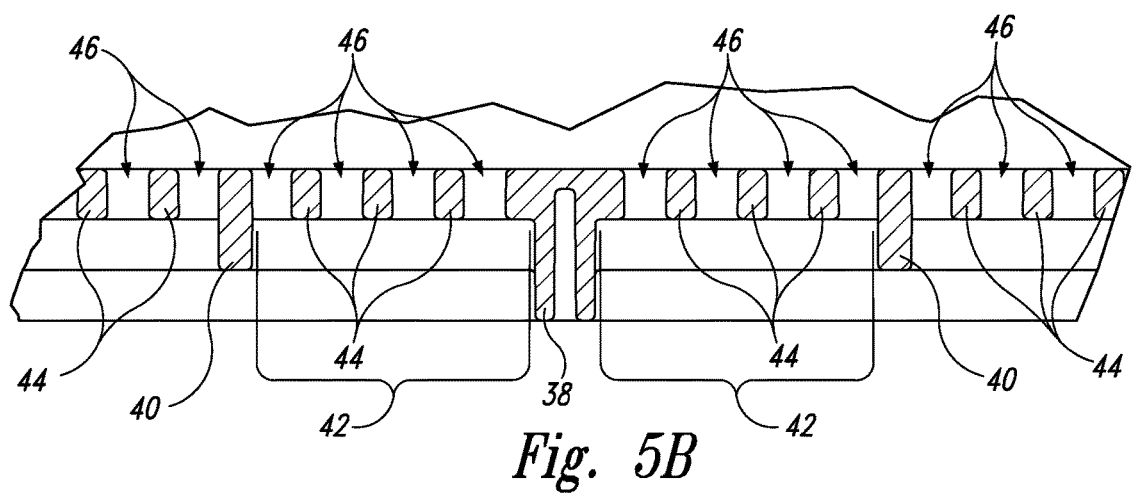
FIG. 5B is a cross-sectional view of the area of the bottom screen taken along line 5B of FIG. 5A.

In addition, and as best shown in FIGS. 4A-B, the upper sift box 16 further includes a bottom screen 34 that, in turn, includes a plurality of discrete screen regions 36 separated from one another by a plurality of first intersecting cross members 38 that span across the bottom screen 34. As best shown in FIGS. 5A-B, each discrete screen region 36 includes a plurality of spaced apart second intersecting cross members 40 that span across each respective discrete screen region 36. As shown, the second intersecting cross members 40 define inner slit regions 42, while a plurality of spaced apart third parallel cross members 44 span across the spaced part second cross members 40 so as to define a plurality of spaced apart parallel slits 46 within each inner slit region 42. As further shown, the plurality of parallel slits 46 within each inner slit region 42 define alternating groups of parallel slits 46, with each group of parallel slits 46 being substantially perpendicular to each adjacent group of parallel slits 46 within each discrete screen area 36.

As also best shown in FIGS. 5A-B, the depths of the first cross members 38 are greater than the depths of the second cross members 40, and wherein the depths of the second cross members are greater than depths of the third cross members 44. The alternating groups of parallel slits 46 are sized and configured to hold back (i.e., prevent passage) of pellet-type cat litter (shown in FIG. 3—pellets 11) such as, for example, pine pellets, while allowing sawdust 13 to fall (i.e., pass) through, and are strong and rigid enough to support the weight of a cat (not shown). In this configuration, the spent litter sawdust 13 material created by cat urine (not shown) will easily be able fall through the slits 46 with only a few scrapes from a litter scoop, or from the cat scratching through the litter itself.

The nestable cat litter box 10 of the present invention is preferably made of a thermoplastic such as, for example, a moldable polypropylene (PP) or polyethylene (PE) type polymer (or other similar type of plastic), and is generally sized and configured to accommodate use by a domesticated house cat. The bottom collection box 12, the middle support shell 14, the upper sift box 16 are each preferably rectangular in shape with four opposing walls (as shown). In addition, the bottom collection box 12 is preferably sized and configured for lining with a standard size litter box liner 37.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A nestable cat litter box for use with pellet type cat litter, comprising:
    a bottom collection box, the bottom collection box including an inner collection box peripheral wall having a top ledge and an outer collection box peripheral wall concentric about the inner collection box peripheral wall,
    a middle support shell removably attachable to the bottom collection box, the middle support shell including an outer shell peripheral wall that, when the middle support shell is positioned about and placed on the bottom collection box, sealingly abuts and frictionally fits together with the outer collection box peripheral wall, the middle support shell further including an inwardly and downwardly extending curved ledge connected to an upper portion of the outer shell peripheral wall, and an upper sift box removably attachable to the middle support shell, the upper sift box including a matching bottom peripheral curved edge that, when the upper sift box is positioned within and placed on the middle support shell, sealingly abuts and frictionally fits together with the curved ledge of the middle support shell, the upper sift box further including a bottom screen, the bottom screen including a plurality of discrete screen regions separated from one another by a plurality of first intersecting cross members that span across the bottom screen, each discrete screen region including a plurality of spaced apart second intersecting cross members that span across each respective discrete screen region, the second intersecting cross members defining inner slit regions, and wherein a plurality of spaced apart third parallel cross members span across the spaced part second cross members so as to define a plurality of spaced apart parallel slits within each inner slit region, wherein the plurality of parallel slits within each inner slit region define alternating groups of parallel slits, wherein each group of parallel slits is substantially perpendicular to each adjacent group of parallel slits within each discrete screen area.

2. The nestable cat litter box of claim 1 wherein the depths of the first cross members are greater than the depths of the second cross members, and wherein the depths of the second cross members are greater than depths of the third cross members.

3. The nestable cat litter box of claim 2 wherein the top ledge of the inner collection box peripheral wall of the bottom collection box, when the middle support shell is positioned about and placed on the bottom collection box, abuts both (i) a lower portion of the curved ledge of the middle support shell, and (ii) a peripheral edge of the bottom screen of the upper sift box.

4. The nestable cat litter box of claim 3 wherein the outer shell peripheral wall of the middle support shell includes a lower peripheral shell wall edge, and wherein the outer collection box peripheral wall of the bottom collection box includes a matching lower peripheral outer collection box wall edge, wherein the lower peripheral shell wall edge fits inside and engages the matching lower peripheral outer collection box edge when the middle support shell is positioned about and placed on the bottom collection box.

5. The nestable cat litter box of claim 4, further comprising a scatter shield removably attachable to the upper sift box, wherein the scatter shield includes a lower peripheral scatter shield edge, and wherein the upper sift box includes a matching upper peripheral sift box edge, wherein the lower peripheral scatter shield edge fits inside and engages the matching upper peripheral outer collection box edge when the scatter shield is positioned about and placed on the upper sift box.

6. The nestable cat litter box of claim 4 wherein the bottom collection box, the middle support shell, the upper sift box each are rectangular in shape with four opposing walls.

\* \* \* \* \*